United States Patent
Foege et al.

(10) Patent No.: US 10,358,148 B2
(45) Date of Patent: Jul. 23, 2019

(54) SYSTEM AND METHOD FOR REDUCING VAPOR GENERATION IN LIQUEFIED NATURAL GAS FUELED VEHICLE

(71) Applicant: Progress Rail Locomotive Inc., LaGrange, IL (US)

(72) Inventors: Aaron Gamache Foege, Westmont, IL (US); Walter Henry Klaric, Westmont, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 285 days.

(21) Appl. No.: 15/219,751

(22) Filed: Jul. 26, 2016

(65) Prior Publication Data
US 2018/0030941 A1 Feb. 1, 2018

(51) Int. Cl.
| | | |
|---|---|---|
| *G05D 1/00* | (2006.01) | |
| *G05D 3/00* | (2006.01) | |
| *G06F 7/00* | (2006.01) | |
| *G06F 17/00* | (2019.01) | |
| *B61C 5/00* | (2006.01) | |
| *B61C 17/02* | (2006.01) | |

(52) U.S. Cl.
CPC ............... *B61C 5/00* (2013.01); *B61C 17/02* (2013.01); *Y02T 30/10* (2013.01)

(58) Field of Classification Search
None
See application file for complete search history.

(56) References Cited

U.S. PATENT DOCUMENTS

| | | | |
|---|---|---|---|
| 5,887,567 A | 3/1999 | White et al. | |
| 2002/0085921 A1* | 7/2002 | Gram | F04B 15/08 417/53 |
| 2014/0123916 A1 | 5/2014 | Coldren et al. | |
| 2014/0217116 A1* | 8/2014 | MacKey | F17C 7/02 222/1 |
| 2014/0299101 A1 | 10/2014 | Melanson et al. | |
| 2015/0219044 A1 | 8/2015 | Melanson et al. | |

FOREIGN PATENT DOCUMENTS

WO 2015/095956 7/2015

* cited by examiner

*Primary Examiner* — Anne M Antonucci
*Assistant Examiner* — Kenny A. Taveras
(74) *Attorney, Agent, or Firm* — Miller, Matthias & Hull

(57) ABSTRACT

A method of reducing vapor generation in an LNG fueled vehicle is provided. The LNG fueled vehicle includes an LNG fuel system including an external LNG pump. The method includes a step of predicting if the LNG fueled vehicle will be operated during a first forthcoming time period using a controller. If the LNG fueled vehicle will be operated during the first forthcoming time period, as determined by the first predicting step, the method includes cooling the external LNG pump.

20 Claims, 3 Drawing Sheets

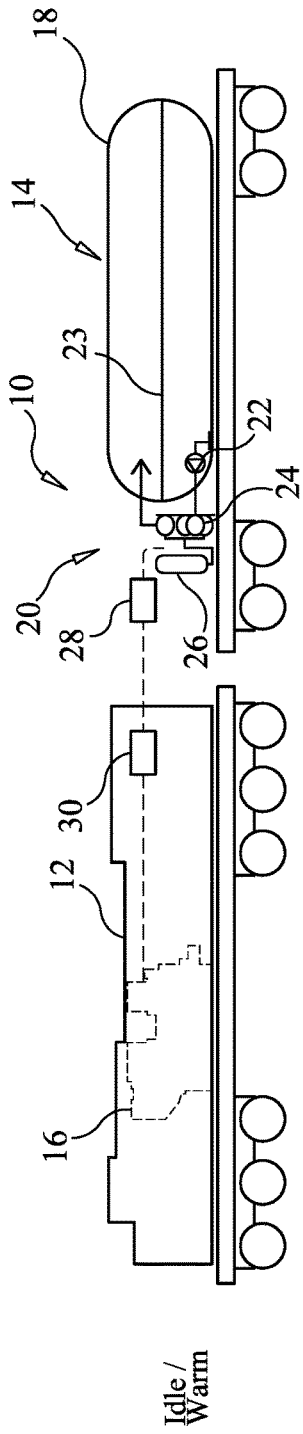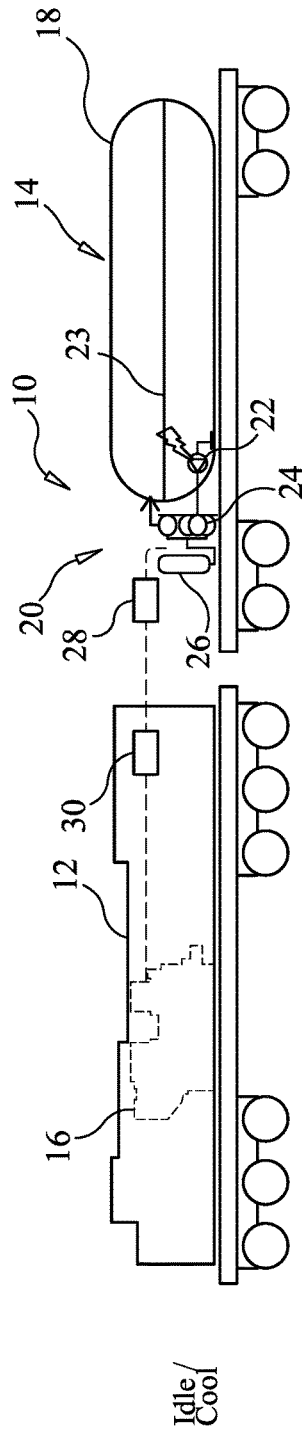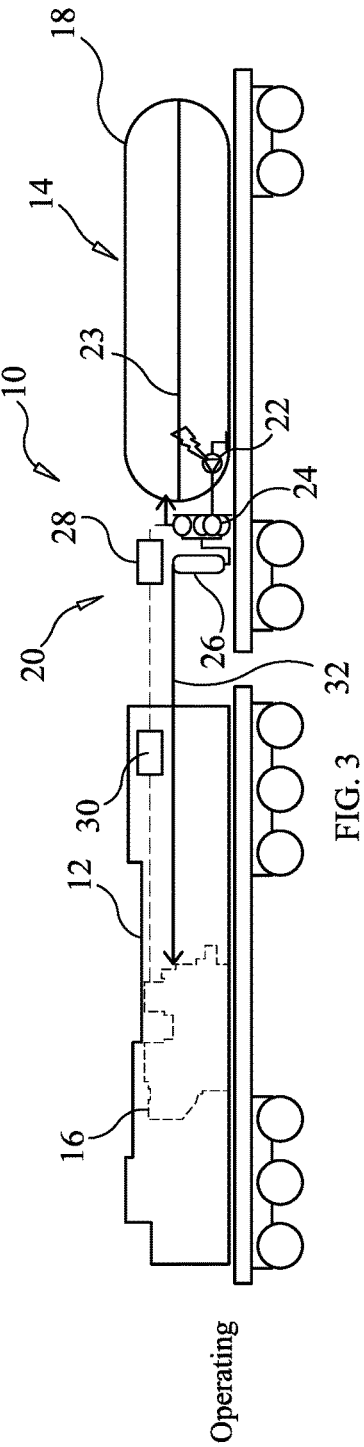

SYSTEM AND METHOD FOR REDUCING VAPOR GENERATION IN LIQUEFIED NATURAL GAS FUELED VEHICLE

TECHNICAL FIELD

The present disclosure relates generally to a liquefied natural gas (LNG) fueled vehicle, and more particularly to a system and method for reducing vapor generation and startup time of the LNG fuel system of the LNG fueled vehicle.

BACKGROUND

Many industries, including the locomotive industry, are exploring and developing alternative fuels and technologies. For instance, some engines have been developed that depend entirely on natural gas, while other engines have been developed that are hybrid engines, which may include bi-fuel engines that change operating mode enough to be considered hybrid, having dual fuel capabilities, e.g., natural gas and diesel fuels. Compressed natural gas and LNG have both been explored as alternative fuels. Compressed natural gas has a low energy density and has high pressure storage requirements, which makes it a costly and less efficient alternative. LNG, on the other hand, has an energy density much higher than compressed natural gas and can be stored at much lower pressures than compressed natural gas. As such, the locomotive industry has been looking to LNG as a viable fuel alternative.

Special tender cars are used with locomotives that have cryogenic tanks for storing and transporting the LNG at low pressure and temperatures of between about −280° F. and −180° F. The tanks are thermally insulated to reduce heat transfer into the LNG from the environment. Cryogenic pumps and vaporizers, and additional equipment, are used to warm the LNG to convert the LNG into a gaseous state and deliver the gas to the engine at an appropriate pressure.

Some LNG fuel systems, such as those used for fueling locomotives, have external, or non-submerged, cryogenic pumps. External cryogenic pumps need to go through a period of cool down before they are ready for rated operation. During the cool down period, LNG is gradually introduced to the pump, where it flashes to natural gas vapor, cooling down the pump in the process. The process of cooling down the pump creates two problems: first, the cool down process takes a long time, such as, for example, around 30 minutes; and secondly, the cool down process creates a large amount of LNG vapor that must be stored or vented. Since natural gas is a potent greenhouse gas, venting is not environmentally sound practice.

WO 2015/095956 to Rosa et al. (hereinafter "Rosa") discloses a control system for managing a supply of gaseous fuel on a tender car. In particular, the control system controls the transitioning between a plurality of states, or operational modes, of the tender car. For example, the supply of gaseous fuel on a tender car requires the coordination of a variety of operational modes, such as delivering, refueling, draining, capturing and storing gaseous fuel. However, the Rosa reference does not discuss or address the issues associated with the creation of LNG vapor.

As should be appreciated, there is a continuing need to provide improved systems and methods for efficiently utilizing alternative fuels.

SUMMARY OF THE INVENTION

In one aspect, a method of reducing vapor generation in an LNG fueled vehicle is provided. The LNG fueled vehicle includes an LNG fuel system including an external LNG pump. The method includes a step of predicting if the LNG fueled vehicle will be operated during a first forthcoming time period using a controller. If the LNG fueled vehicle will be operated during the first forthcoming time period, as determined by the first predicting step, the external LNG pump will be cooled.

In another aspect, a system for reducing vapor generation in an LNG fueled vehicle is provided. The LNG fueled vehicle includes an LNG fuel system including an external LNG pump. The system includes a controller configured to predict if the LNG fueled vehicle will be operated during a first forthcoming time period. Further, if the LNG fueled vehicle will be operated during the first forthcoming time period, as determined by the first predicting step, the controller cools the external LNG pump.

BRIEF DESCRIPTION OF THE DRAWINGS

FIG. 1 is a schematic view of a locomotive and a tender car (or LNG fueled vehicle) in a first idling state, according to one aspect of the present disclosure;

FIG. 2 is a schematic view of the LNG fueled vehicle of FIG. 1 in a second idling state, according to another aspect of the present disclosure;

FIG. 3 is a schematic view of the LNG fueled vehicle of FIGS. 1 and 2 in an operating state, according to another aspect of the present disclosure;

DETAILED DESCRIPTION

Figure 4:
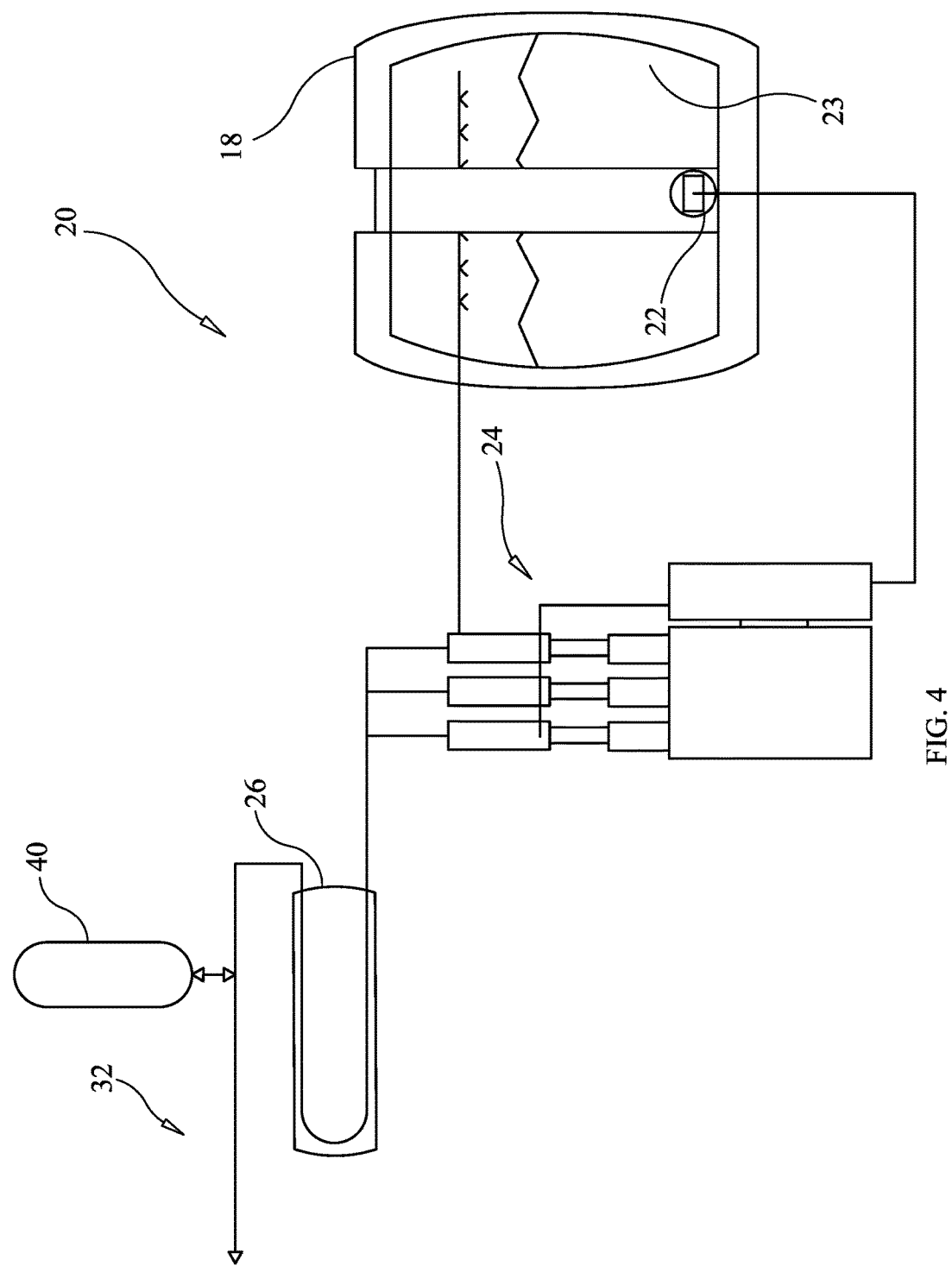
FIG. 4 is an exemplary LNG fuel system of the LNG fueled vehicle of the previous FIGS., according to another aspect of the present disclosure.

As is shown in FIG. 1, an exemplary LNG fueled vehicle 10 may include a locomotive 12 and a tender car 14. The locomotive 12 supports an LNG fueled engine 16, while the tender car 14 supports an LNG storage tank 18, also referred to as a cryogenic storage tank or cryogenic vessel. An exemplary LNG fuel system 20 may include, among other components, an LNG transfer pump 22, submerged in the LNG storage tank 18 and configured for pumping LNG 23 from the LNG storage tank 18. From the LNG storage tank 18, LNG 23 is passed through an external LNG pump 24, which is non-submerged, where the LNG 23 is pressurized. According to the exemplary embodiment, the LNG 23 is also passed through a vaporizer 26, which provides natural gas in a gaseous state to the LNG fueled engine 16. A first controller 28, such as an electronic controller known to those skilled in the art, may be provided for controlling operation of the LNG fuel system 20, while a second controller 30, such as an electronic controller, may be provided for controlling operation of the LNG fueled engine 16. Of course, the operations may be controlled by any number or configuration of vehicle controllers.

According to FIG. 1, the LNG fueled vehicle 10 is shown in a first idling state. In the first idling state, the LNG fueled vehicle 10 is not operating, i.e., not being propelled, and the external LNG pump 24 is allowed to return to ambient temperature, which causes the LNG 23 currently in the LNG fuel system 20 to boil into vapor and also allows any frost accumulation on bare piping to melt. Turning now to FIG. 2, the LNG fueled vehicle 10 is shown in a second idling state, according to the present disclosure, in which, although the LNG fueled vehicle 10 is not in an operating state, the LNG transfer pump 22 is operating and causing LNG 23 to be circulated through the LNG fuel system 20 to keep the external LNG pump 24 cool. This alternative idling state, according to the present disclosure, will be discussed below in greater detail. In the operating state of the LNG fueled vehicle 10, as illustrated in FIG. 3, the LNG transfer pump 22 is operating and the LNG fuel system 20 is supplying LNG, in a gaseous state, 32 to the LNG fueled engine 16 for propulsion of the LNG fueled vehicle 10.

FIG. 4 is a more detailed schematic of the exemplary LNG fuel system 20 of the LNG fueled vehicle 10 of the previous FIGS., according to another aspect of the present disclosure. As referenced above, the LNG 23 in the LNG storage tank 18 is stored at low pressure and cryogenic temperatures. To supply the LNG 23 at a high pressure, as may be required by the LNG fueled engine 16 (not shown), the LNG 23 must be vaporized and delivered at very high pressures. Thus, as illustrated, the LNG fuel system 20 may include the LNG transfer pump 22 introduced above for pumping LNG 23 from the LNG storage tank 18. The LNG fuel system 20 may also include the external LNG pump 24, or cryogenic pump, described above, for fuel pressurization, and the vaporizer 26 for warming and vaporizing the pressurized liquid fuel 23.

The external LNG pump, or cryogenic pump, 24 raises the pressure of the LNG 23 from below about 10 bar to more than about 500 bar at an outlet of the cryogenic pump 24. The pressurized LNG 23 may then be processed through the vaporizer 26, where heat from a transfer medium, such as air, water, or coolant, is used to warm the pressurized LNG 23 to vaporize it for delivery through a high pressure vaporizer line to an accumulator 40. The accumulator 40 may store the highly compressed natural gas 32 for regulated delivery to the LNG fueled engine 16 at a precisely controlled pressure.

As stated above, the locomotive 12 and/or tender car 14 may have one or more controllers 28, 30 that enable monitoring and control of the LNG fuel system 20. According to the present disclosure, the one or more controllers 28, 30 may be programmed or configured to predict if the LNG fueled vehicle 10 will be operated during a forthcoming time period and, if the LNG fueled vehicle 10 will be operated during the forthcoming time period, cool the external LNG pump 24. That is, the one or more controllers 28, 30 may be configured to transition the LNG fuel system 20 from the first idling state, discussed with reference to FIG. 1, to the second idling state, discussed with reference to FIG. 2. Additionally or alternatively, the one or more controllers 28, 30 may be configured to maintain the second, or cool, idling state of FIG. 2 if the LNG fuel system 20 is in the second idling state of FIG. 2 and the LNG fueled vehicle 10 will be operated during a different forthcoming time period.

INDUSTRIAL APPLICABILITY

The present disclosure is applicable to LNG fueled vehicles, such as LNG fueled vehicle 10 described herein. More particularly, the present disclosure is applicable to LNG fueled vehicles having an LNG fuel system, such as LNG fuel system 20, which includes an external LNG pump 24. Yet further, the present disclosure may find applicability in LNG fueled locomotives having significant periods of idling. Although a specific embodiment is disclosed herein, the present disclosure has broader applicability, including applicability to various LNG fuel systems.

External LNG pumps, or cryogenic pumps, as described herein, need to go through a period of cool down before they are ready for rated operation. During rated operation, LNG is gradually introduced to the external LNG pump, where it is flashed to natural gas vapor, cooling down the external LNG pump in the process. Once the external LNG pump has reached the temperature of the LNG, the external LNG pump is ready to begin rated operation. This process creates two problems, however: first, the cool down process takes a long time, such as around 30 minutes; and, secondly, the cool down process creates a large amount of LNG vapor, which must be either stored or vented. Natural gas is a potent greenhouse gas, so venting is not environmentally sound practice. Further, storage may be a concern in applications that have little margin on storage pressure or have no practical use for the gas at the storage pressure.

Figure 5:
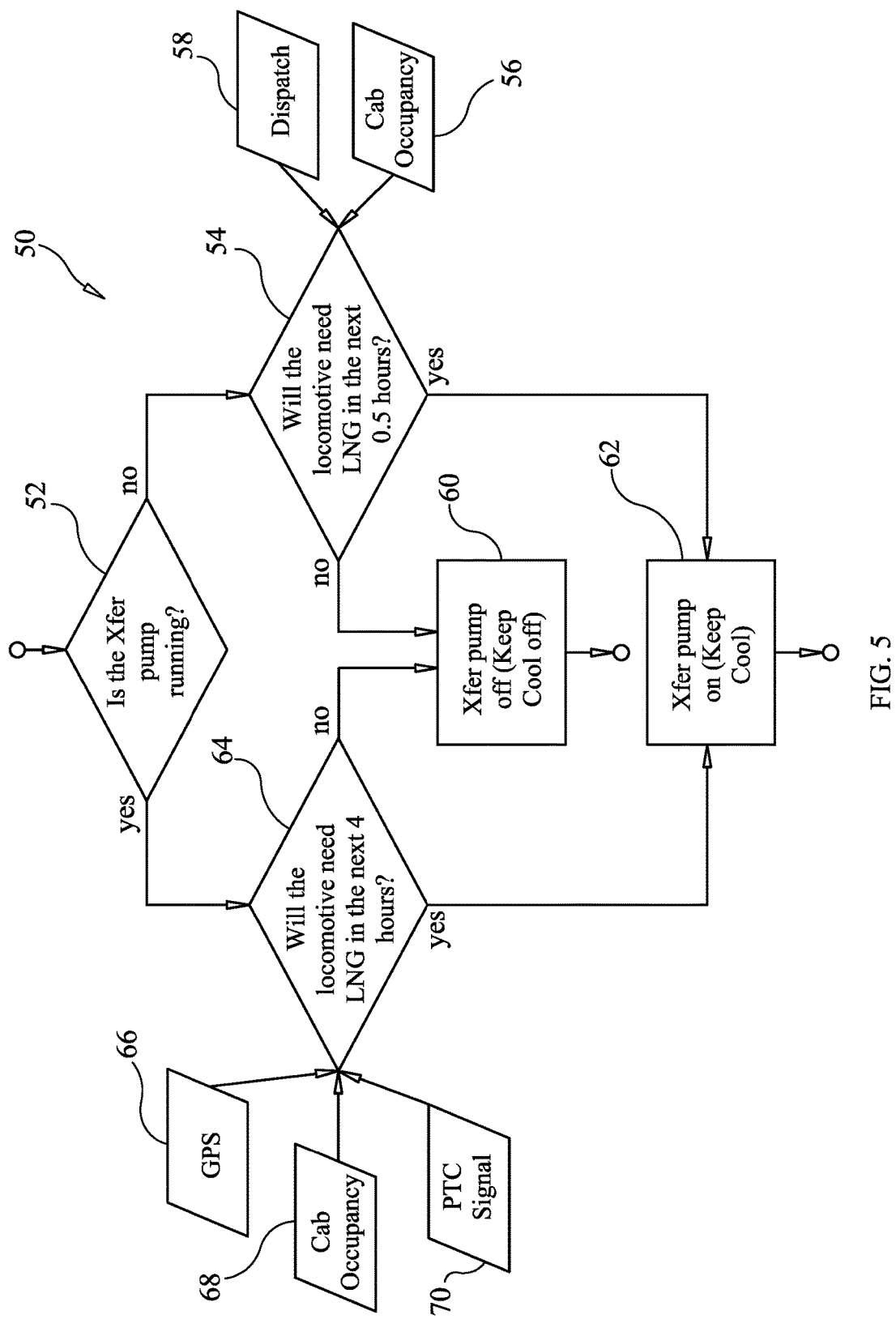
FIG. 5 is an exemplary method of reducing vapor generation in the LNG fuel system, and thus LNG fueled vehicle, of the previous FIGS., according to another aspect of the present disclosure.

According to a system and method of the present disclosure, vapor generation may be reduced in an LNG fuel system 20 and, thus, LNG fueled vehicle 10. In particular, the one or more controllers 28, 30 may be configured to predict if the LNG fueled vehicle 10 will be operated in a forthcoming time period and, if so, cool a portion of the LNG fuel system 20 including the external LNG pump 24. Referring generally to FIGS. 1-5, and more particularly to FIG. 5, one or both of the controllers 28 and 30 may be programmed, according to the present disclosure, to reduce vapor generation in the LNG fueled vehicle 10. FIG. 5 illustrates an exemplary method of the present disclosure using a flow diagram 50. The method may be implemented in whole or in part by a processor of one or both of the controllers 28, 30 and may run continuously, intermittently, or at predetermined intervals.

The method begins at STEP 52, in which one or both of the controllers 28, 30 determine if the LNG transfer pump 22 is running. If the LNG transfer pump 22 is not running, the one or more controllers 28, 30 will perform predicting STEP 54. That is, at STEP 54, the method determines whether the LNG fueled vehicle 10 will be operated during a forthcoming time period. According to the exemplary STEP 54, the forthcoming time period may be between about fifteen minutes and about forty-five minutes, or may be about thirty minutes. According to the exemplary embodiment, predicting operation of the LNG fueled vehicle 10 during a forthcoming time period may include an evaluation, by one or both of the controllers 28, 30, of at least one of operator cab occupancy 56 and a dispatch schedule 58.

If it is determined that LNG (LNG 23 converted to a gaseous state 32) will not be needed within the forthcoming time period for operation of the LNG fueled vehicle 10, the method proceeds to STEP 60, in which the LNG transfer pump 22 remains off. Otherwise, if it is determined that the LNG fueled vehicle 10 will be operated within the forthcoming time period, the LNG transfer pump 22 will be turned on such that LNG 23 will be circulated through the LNG transfer pump 22 to cool the pump 22.

Returning to STEP 52, if it is determined that the LNG transfer pump 22 is running, the one or more controllers 28, 30 will predict whether the LNG fueled vehicle 10 will be operated during a forthcoming time period, at STEP 64. According to the exemplary STEP 64, the forthcoming time period may be between about three hours and about five hours, or may be about four hours. According to the exemplary embodiment, predicting operation of the LNG fueled vehicle 10 at STEP 64 may include an evaluation, by one or both of the controllers 28, 30, of at least one of operator cab occupancy 68, geographic location 66, such as a geographic location determined by a GPS, and input from a positive train control system 70.

If it is determined that LNG (LNG 23 converted to a gaseous state 32) will not be needed within the forthcoming time period for operation of the LNG fueled vehicle 10, the method proceeds to STEP 60, in which the LNG transfer pump 22 is turned off. Otherwise, if it is determined that the LNG fueled vehicle 10 will be operated within the forthcoming time period, the LNG transfer pump 22 will remain on such that LNG 23 will be circulated through the LNG transfer pump 22 to keep the pump 22 cool.

The present disclosure uses predictive logic in the controller 28, 30 to estimate when the LNG fueled vehicle 10 will be operating and when it will not be operating. The controller 28, 30 can then produce a "keep cool" request to the LNG fuel system 20 when operation is expected to occur within a predetermined time period, such as, for example, about thirty minutes. If this operation is expected to occur, the controller 28, 30 will trigger circulation of LNG 23 through the LNG fuel system 20 by either opening valves or starting the LNG transfer pump 22. Once the external LNG pump 24 is cold, the controller 28, 30 will either hold the "keep cool" request on to keep LNG 23 circulating if operation is expected within the next several hours, or will stop operation of the LNG transfer pump 22. This method prevents the LNG 23 already in the LNG fuel system 20 and the LNG 23 required to cool the external LNG pump 24 back down the next time operation occurs from being converted to vapor.

However, as LNG 23 circulates through the external LNG pump 24 it absorbs heat from the environment and may produce a small amount of vapor. As such, the controller 28, 30 should be configured to weigh the cost of keeping the LNG transfer pump 22 running to keep the external LNG pump 24 cool (in terms of energy consumption, or vapor created, or some combination thereof) against the cost of allowing the external LNG pump 24 to warm back up and cool down again. For a proposed LNG fueled vehicle 10, this payback is expected to occur around about four hours. So, if operation is expected in the next four hours, for example, the LNG transfer pump 22 will remain active, but will cease operation if the LNG fueled vehicle 10 is not predicted to operate within the next four hours.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A method of reducing vapor generation in a liquefied natural gas (LNG) fueled vehicle, the LNG fueled vehicle including an LNG fuel system including an external LNG pump, the method comprising steps of:
   predicting if the LNG fueled vehicle will be operated during a forthcoming time period using a controller; and
   if the LNG fueled vehicle will be operated during the forthcoming time period, as determined by the predicting step, cooling the external LNG pump.

2. The method of claim 1, wherein the LNG fuel system includes an LNG storage tank and an LNG transfer pump fluidly connected between the LNG storage tank and the external LNG pump and operable to pump LNG from the LNG storage tank to the external LNG pump, the method further including:
   determining whether the LNG transfer pump of the LNG fuel system is currently running; and
   performing the predicting step only if the LNG transfer pump is not currently running.

3. The method of claim 2, wherein the predicting step includes evaluating, by the controller, at least one of operator cab occupancy and a dispatch schedule.

4. The method of claim 2, wherein the forthcoming time period is between about fifteen minutes and about forty-five minutes.

5. The method of claim 1, wherein the LNG fuel system includes an LNG storage tank and an LNG transfer pump fluidly connected between the LNG storage tank and the external LNG pump and operable to pump LNG from the LNG storage tank to the external LNG pump, the method further including:
   determining whether the LNG transfer pump of the LNG fuel system is currently running; and
   performing the predicting step only if the LNG transfer pump is currently running.

6. The method of claim 5, wherein the predicting step includes evaluating, by the controller, at least one of operator cab occupancy, geographic location, and input from a positive train control system.

7. The method of claim 6, wherein the forthcoming time period is between about three hours and about five hours.

8. The method of claim 1, wherein cooling the external LNG pump includes circulating LNG through the external LNG pump.

9. The method of claim 8, wherein the LNG fuel system includes an LNG storage tank and an LNG transfer pump fluidly connected between the LNG storage tank and the external LNG pump and operable to pump LNG from the LNG storage tank to the external LNG pump, and wherein cooling the external LNG pump includes one of starting the LNG transfer pump of the LNG fuel system and maintaining a running state of the LNG transfer pump.

10. The method of claim 1, wherein the LNG fuel system includes an LNG storage tank and an LNG transfer pump fluidly connected between the LNG storage tank and the external LNG pump and operable to pump LNG from the LNG storage tank to the external LNG pump, method further including:
   determine whether the LNG transfer pump of the LNG fuel system is currently running;
   predict if the LNG vehicle will be operated during a first forthcoming time period in response to determining that the LNG transfer pump is not currently running; and
   predict if the LNG vehicle will be operated during a second forthcoming time period in response to determining that the LNG transfer pump is currently running, wherein the second forthcoming time period is greater than the first forthcoming time period.

11. A system for reducing vapor generation in a liquefied natural gas (LNG) fueled vehicle, the LNG fueled vehicle including an LNG fuel system including an external LNG pump, comprising:
   a controller configured to:
      predict if the LNG fueled vehicle will be operated during a forthcoming time period; and
      if the LNG fueled vehicle will be operated during the forthcoming time period, as determined by the predicting step, cool the external LNG pump.

12. The system of claim 11, wherein the LNG fuel system includes an LNG storage tank and an LNG transfer pump fluidly connected between the LNG storage tank and the external LNG pump and operable to pump LNG from the LNG storage tank to the external LNG pump, and wherein the controller is further configured to:
- determine whether the LNG transfer pump of the LNG fuel system is currently running; and
- predict if the LNG vehicle will be operated during the forthcoming time period only if the LNG transfer pump is not currently running.

13. The system of claim 12, wherein the vehicle controller is further configured to predict if the LNG vehicle will be operated during the forthcoming time period by evaluating at least one of operator cab occupancy and a dispatch schedule.

14. The system of claim 12, wherein the forthcoming time period is between about fifteen minutes and about forty-five minutes.

15. The system of claim 11, wherein the LNG fuel system includes an LNG storage tank and an LNG transfer pump fluidly connected between the LNG storage tank and the external LNG pump and operable to pump LNG from the LNG storage tank to the external LNG pump, and wherein the controller is further configured to:
- determine whether the LNG transfer pump of the LNG fuel system is currently running; and
- predict if the LNG vehicle will be operated during the first forthcoming time period only if the LNG transfer pump is currently running.

16. The system of claim 15, wherein the controller is further configured to predict if the LNG vehicle will be operated during the forthcoming time period by evaluating at least one of operator cab occupancy, geographic location, and input from a positive train control system.

17. The system of claim 16, wherein the forthcoming time period is between about three hours and about five hours.

18. The system of claim 11, wherein cooling the external LNG pump includes circulating LNG through the external LNG pump.

19. The system of claim 18, wherein cooling the external LNG pump includes one of starting an LNG transfer pump of the LNG fuel system and maintaining a running state of the LNG transfer pump.

20. The system of claim 11, wherein the LNG fuel system includes an LNG storage tank and an LNG transfer pump fluidly connected between the LNG storage tank and the external LNG pump and operable to pump LNG from the LNG storage tank to the external LNG pump, and wherein the controller is further configured to:
- determine whether the LNG transfer pump of the LNG fuel system is currently running;
- predict if the LNG vehicle will be operated during a first forthcoming time period in response to determining that the LNG transfer pump is not currently running; and
- predict if the LNG vehicle will be operated during a second forthcoming time period in response to determining that the LNG transfer pump is currently running, wherein the second forthcoming time period is greater than the first forthcoming time period.

* * * * *